Sept. 4, 1962 M. KRAKINOWSKI ET AL 3,052,874
PERMUTATIONALLY CONTROLLED TRACK SELECTOR FOR
MULTI-TRACK RECORDING AND READ-OUT SYSTEMS
Filed Aug. 22, 1958 7 Sheets-Sheet 1
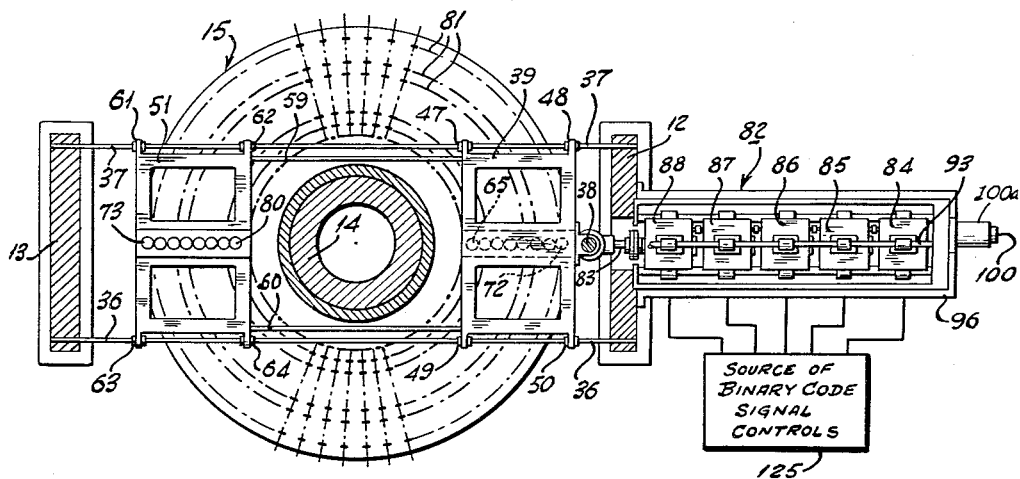
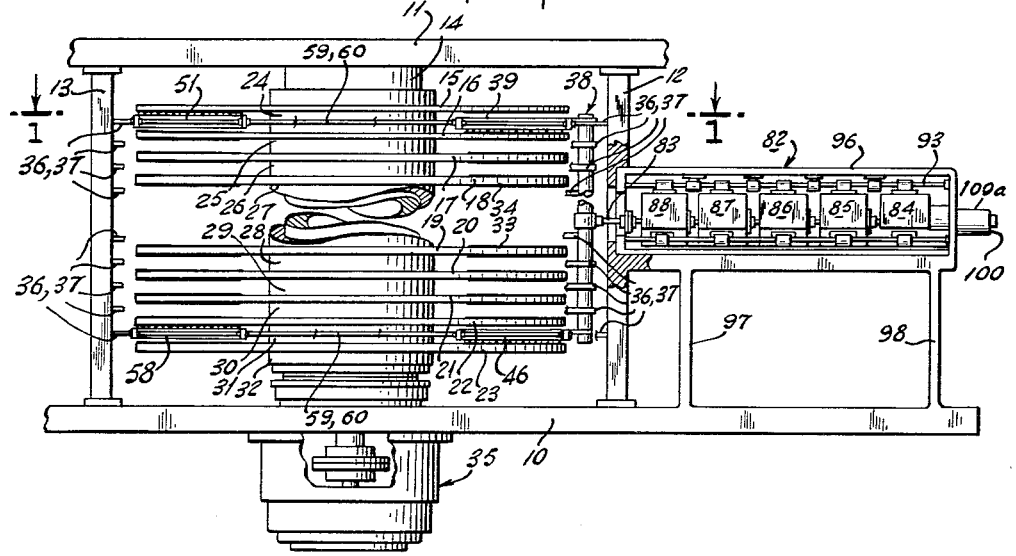
INVENTORS
MORRIS KRAKINOWSKI
PHILIP C. MICHEL
BY
John J. Rogan
ATTORNEY

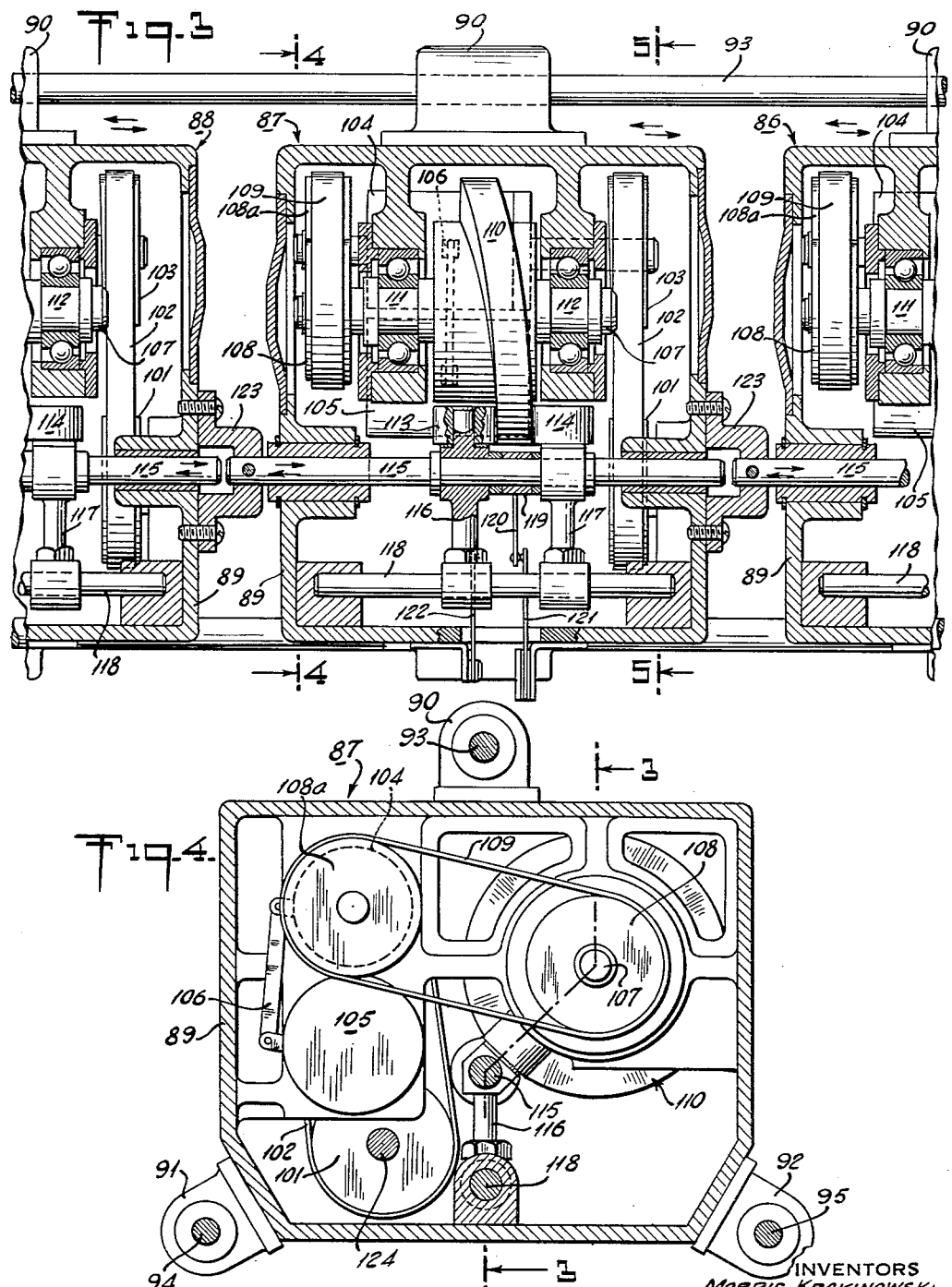

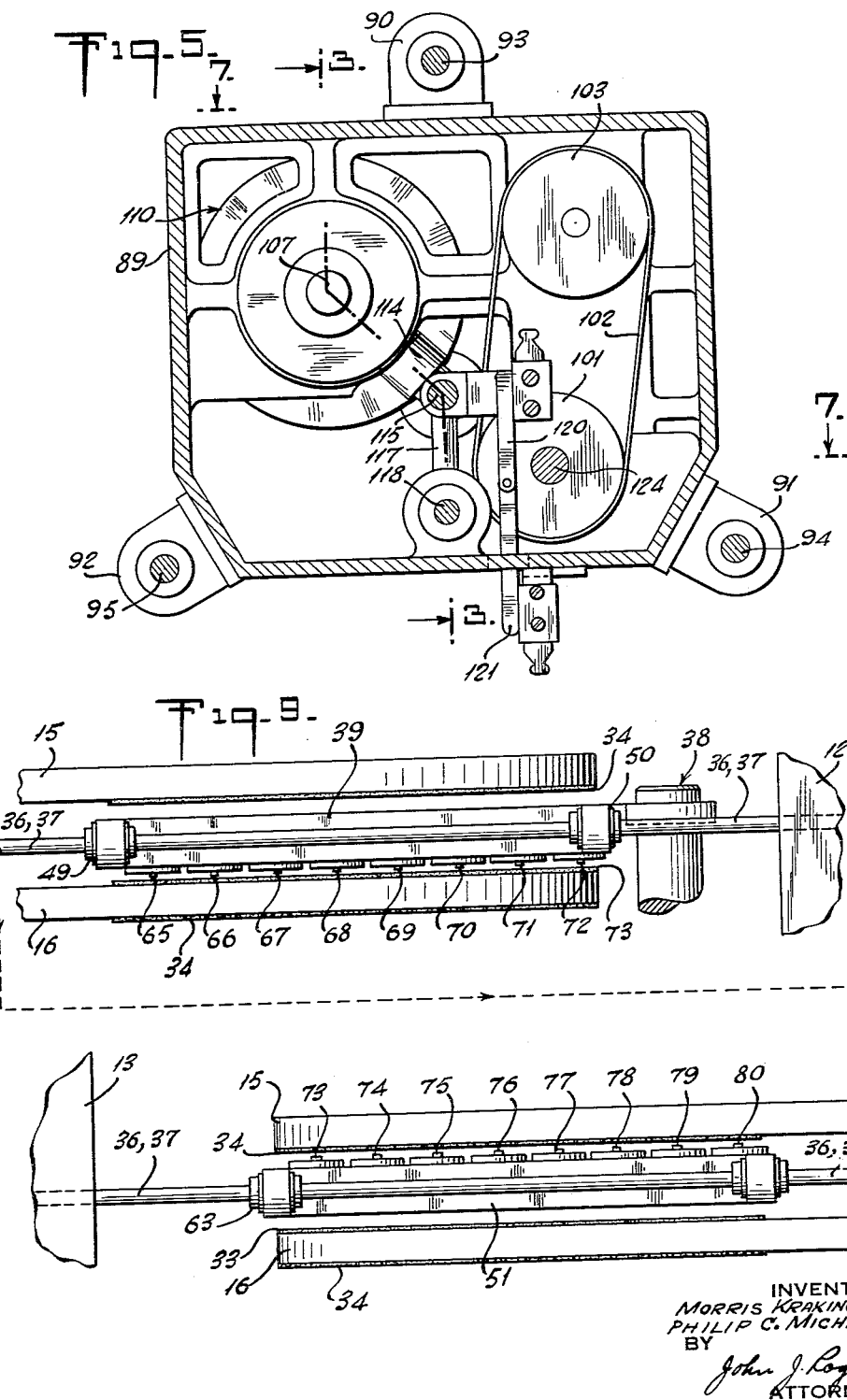

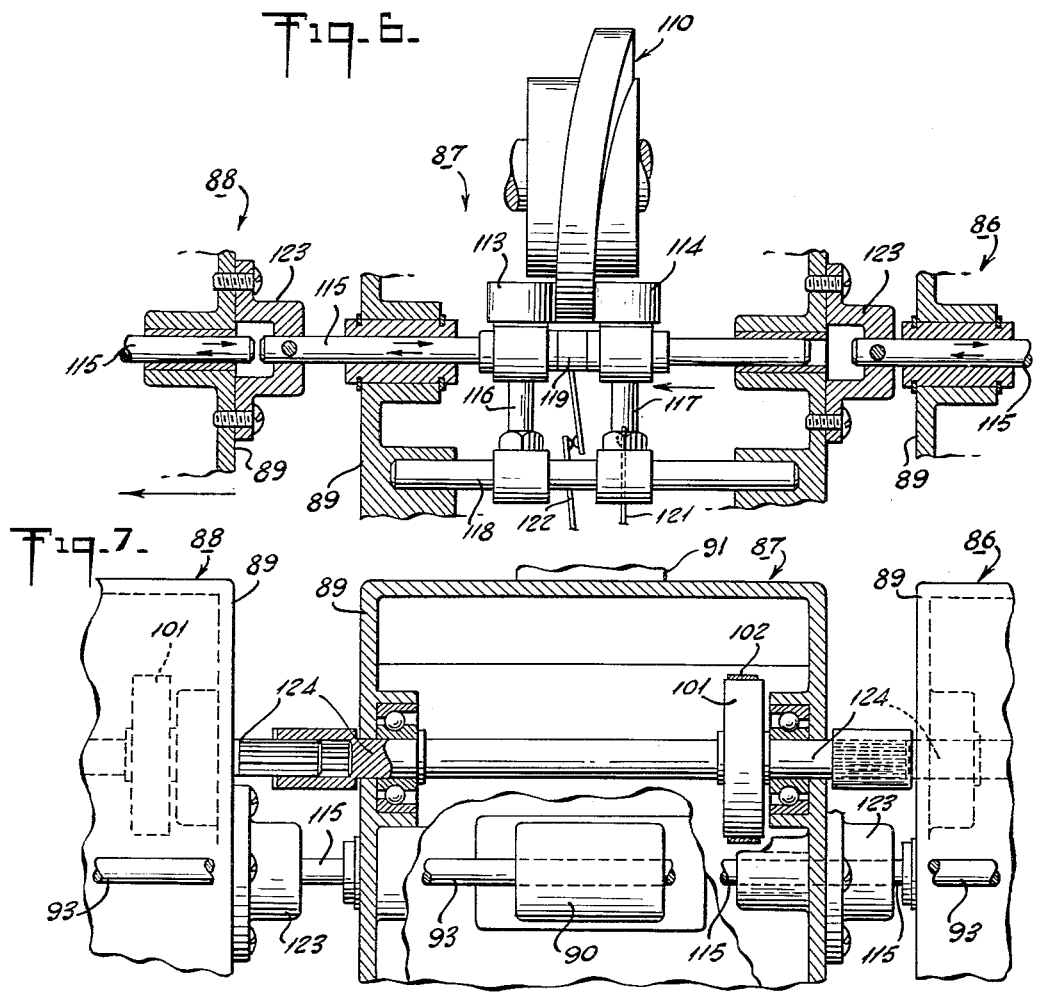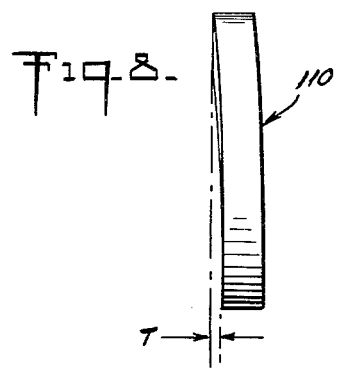

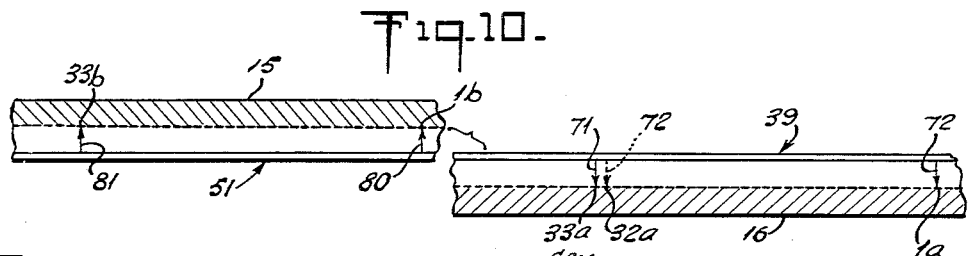
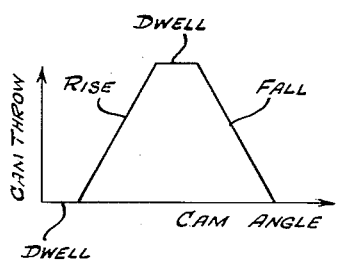
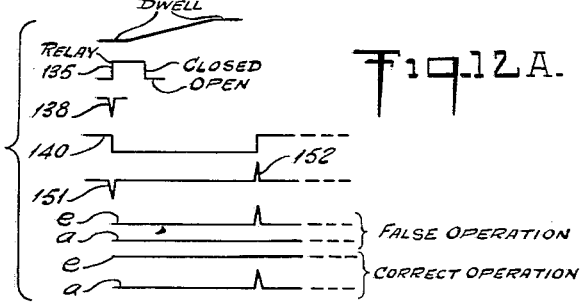
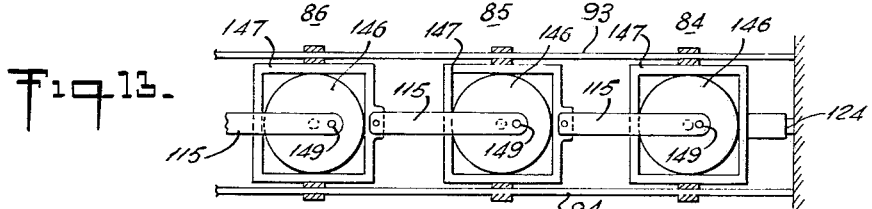
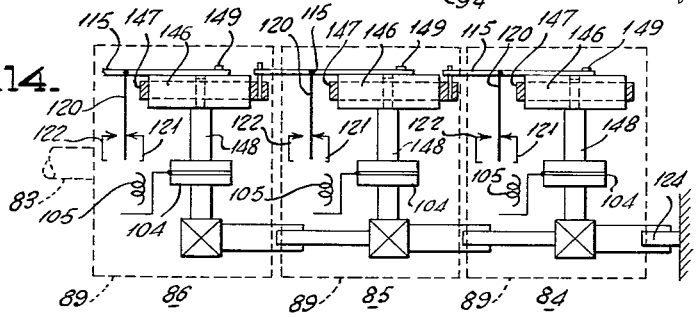
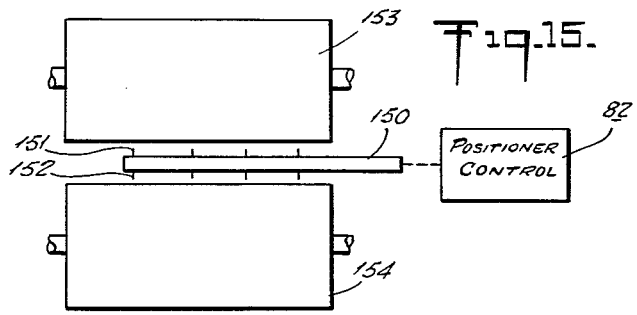

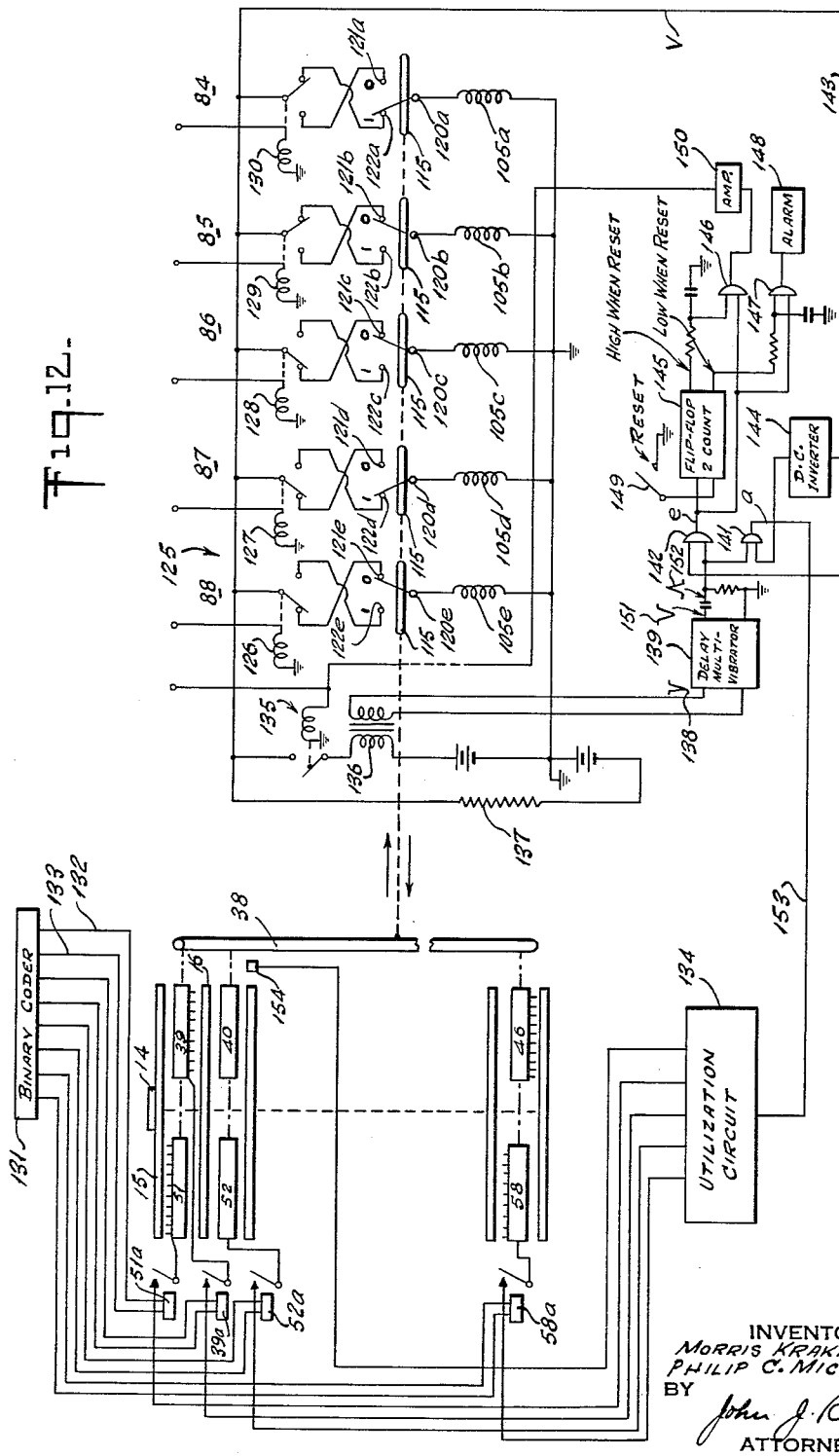

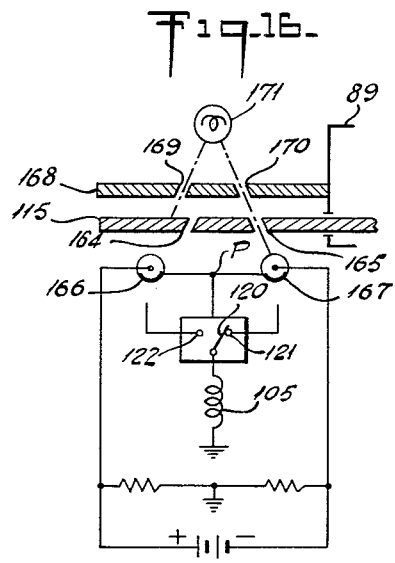
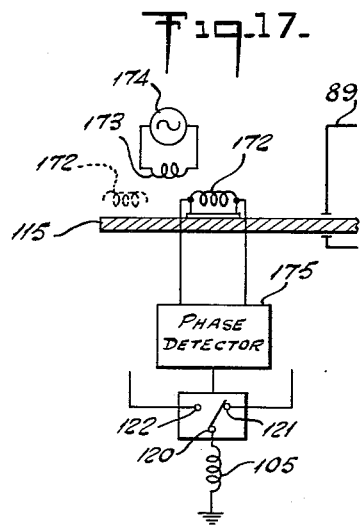
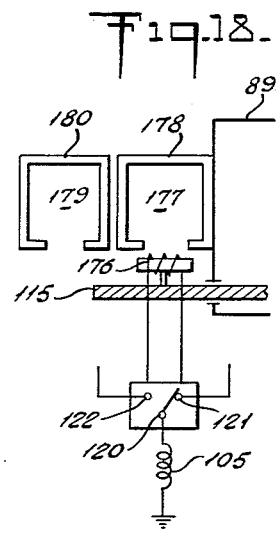
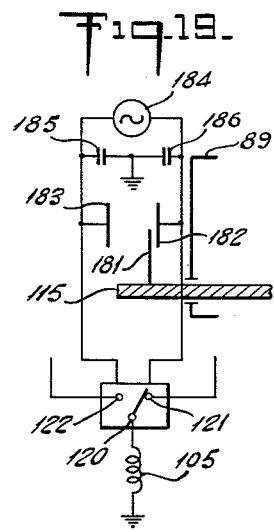

United States Patent Office 3,052,874
Patented Sept. 4, 1962

3,052,874
PERMUTATIONALLY CONTROLLED TRACK SELECTOR FOR MULTI-TRACK RECORDING AND READ-OUT SYSTEMS
Morris Krakinowski, Westchester, N.Y., and Philip C. Michel, Fairfield, Conn., assignors to The Teleregister Corporation, Stamford, Conn., a corporation of Delaware
Filed Aug. 22, 1958, Ser. No. 756,731
14 Claims. (Cl. 340—174.1)

This invention relates to recording and read-out systems and more especially it relates to mechanisms for the selective operation of any one of a relatively large number of recording and read-out devices.

A principal object of the invention is to provide a novel system and organization of apparatus for enabling high speed access between any one of a large number of recording and read-out devices, and a selected track or recorded area on a recording and read-out blank.

Another object is to provide a record and read-out system for a multiplicity of discrete tracks and a smaller number of recording or read-out units, in conjunction with novel permutationally controlled mechanism for operatively associating any desired one of said units with a desired one of the tracks.

Another object is to provide a novel electromechanically controlled selecting system for enabling a large number of record tracks to be serviced for recording or for read-out by a much smaller number of recording or read-out units.

A further object is to provide a novel electromechanically controlled cam arrangement for permutationally selecting one of a large series of record or read-out units for operative relation with one track of a much larger number of record tracks, whereby rapid access time to any given track is achieved with a smoothly controlled movement of the units so as to be substantially free from vibrational shock or noise at the beginning and end of the selective travel of the units with relation to the record tracks.

Another object is to provide a novel electromechanical head positioning system which enables precisely controlled linear motion of a plurality of recording or read-out heads with respect to a multi-track record carrier, under control of permuted selection signals in the binary code so as to bring a selected one of the heads into operative relation with a selected track, thus enabling a great reduction in the number of heads required in the system.

A feature of the invention relates to a recording or read-out system employing a series of spaced discs carrying a multiplicity of concentric record tracks and associated with a plurality of sets of recording or read-out heads, with the total number of heads being much smaller than the number of said tracks, each set of heads being linearly movable parallel to the opposed faces of a pair of spaced discs, in conjunction with a novel multi-cam controlled linear motion cumulator whereby any head may be permutably selected for cooperative relation with a desired track.

Another feature relates to a novel actuating and selecting mechanism for a multi-track record blank such, for example, as a disc having a multiplicity of concentric magnetic tracks, which mechanism comprises a plurality of linearly aligned actuator bars each having a corresponding cam, with the bars arranged for electromechanical and permuted controllable cumulative movement, whereby rapid access to track information is achieved with a minimum of mechanical shock or vibration.

Another feature relates to a novel electromechanical binary controlled selector system for recording or read-out devices of the kind having multi-tracks and multi-heads.

Another feature relates to a novel electromechanical selector for multi-track record or read-out devices, employing a novel binary controlled electric circuit which cooperates with a novel multi-cam controlled linear motion cumulator for permutational setting in one of a number of record or read-out heads in operative relation to a desired one of a much larger number of record tracks, and while providing a self-verifying operation in the electromechanical selection.

A further feature relates to the novel organization, arrangement, and relative location and interconnection of parts which cooperate to provide an improved multi-track record or read-out system which achieves safety and accuracy of recording or read-out, while employing a series of recording or read-out heads much smaller in number than the record tracks, and while achieving a rapid access with a minimum of mechanical noise, jars, or vibration.

Other features and advantages, not specifically enumerated, will be apparent from the ensuing descriptions, the appended claims, and the attached drawing.

In the drawing which shows, by way of example, certain preferred embodiments,

FIG. 1 is an elevational broken view of a mechanism embodying features of the invention;

FIG. 2 is a sectional view of FIG. 1 taken along the line 2—2 thereof;

FIG. 3 is an enlarged elevational sectional view of part of the cam controlled linear cumulator system of FIGS. 1 and 2;

FIG. 4 is a sectional view taken along the line 4—4 of FIG. 3;

FIG. 5 is a sectional view taken along the line 5—5 of FIG. 3;

FIG. 6 is an enlarged partial view of FIG. 3 showing one preferred selective setting of the linear cumulator system;

FIG. 7 is a broken sectional view along the line 7—7 of FIG. 5;

FIG. 8 is a detailed edge view of one of the cams;

FIG. 9 is an enlarged view of part of FIG. 1 with the two halves offset for ease of illustration and to show more clearly the relation between the recording or read-out heads with relation to the opposed faces of a pair of spaced record discs;

FIG. 10 is a schematic diagram expanatory of the head and disc selection;

FIG. 11 is a graph showing the characteristics of one of the selection cams;

FIG. 12 is a schematic wiring diagram of the electric control circuit represented by the block 125 (FIG. 2);

FIG. 12A is a correlated graph diagram used in explaining FIG. 12;

FIGS. 13 and 14 are respective views of a modification of the invention;

FIG. 15 is a schematic view of a further modification of the invention;

FIGS. 16, 17, 18, 19 are schematic representations of modifications of the corresponding parts of FIGS. 1 to 15.

The invention finds its primary utility in connection with magnetic storage or read-out systems where data, indicia, or other intelligence is stored in the form of so-called "bits." It will be understood, of course, that the invention is not limited to the storage of the bits in magnetic form since these bits may be stored as electrostatic bits, or even in the form of surface striations or grooves. Usually such systems employ a rotary drum which cooperates with a series of stationarily mounted recording or read-out heads, there being one such head for each record track on the drum, the tracks being concentrically parallel to each other around the drum. In such systems which require a very large number of bits, for example 30 megabits, in order to have a drum of practical diameter a correspondingly large number of tracks and correspondingly large number of heads are required. In other words, the number of heads required is usually in direct proportion to the number of bits and must equal the total number of concentric tracks. One possible solution for reducing the number of heads without reducing the number of tracks or bits is to shift one or more heads with respect to the length of the drum so that one head may service a plurality of tracks. Since access time is a limitation in most systems, ordinary actuator means for shifting the head or heads, such as a hydraulic means, are objectionable because of the unavoidable shock, jar, or vibration concomitant with the opening and closing of the hydraulic system, which is reflected in vibrational shock or noise that may interfere with the accuracy of recording and of the read-out signals. The present invention overcomes that disadvantage, as well as other disadvantages of prior arrangements, by employing a novel multi-cam selector which is electromagnetically controlled by binary code input signals to cumulatively position a series of linearly arranged operating shafts which, in turn, are coupled to a block which carries the various recording or read-out heads.

Referring to FIG. 1, the mechanism may comprise a rigid frame constructed, for example, with a lower base plate 10, and an upper plate 11, which are rigidly united by end stanchions 12, 13. Rotatably mounted in suitable bearings in the plates 10, 11, is the main spindle 14 to which there are fastened, for example by keying, a series of record discs 15—23 spaced apart longitudinally of the spindle by respective integral hubs 24—32. While the drawing shows nine such discs, it will be understood that a greater or less number may be used. The upper faces of the several discs are provided with a coating or sheath 33 of magnetizable material, such as is conventionally used in magnetic recording drums and the like. Similarly, the lower face of each disc has a coating or sheath 34 of the same magnetic material (see FIG. 9). It will be understood, of course, that each disc may be made entirely of suitable magnetizable material. Preferably, however, where a magnetizable coating is employed, it extends only part way to the center of the respective discs. Suitably mounted on the bottom of plate 10 is a motor 35 which drives the spindle and discs at a predetermined uniform speed.

Extending between the stanchions 12, 13 are a series of guide rails 36, 37, each pair of guide rails being located between a corresponding pair of spaced discs. Extending in a vertical direction between the guide rails is a rod 38 to which are rigidly fastened a series of carriages 39—46 each of which extends horizontally between a pair of adjacent discs. Each carriage is provided with linear ball bearings 47, 48, and 49, 50 which ride on the respective guide rails 36, 37. Each one of a similar set of carriages 51—58 is united to a corresponding one of the carriages 39—46 by respective tie rods 59, 60, the latter also having respective bearings 61, 61, 63, 64 riding on respective rails 36, 37.

Thus by moving rod 38 towards the left or towards the right, all the carriages are moved as a unit, parallel to the faces of the respective discs between which they are located. The right hand carriages, for example carriages 39—46, carry on their lower faces a series of recording or read-out heads 65—72 (see FIG. 9), while each of the left hand carriages 51—58 carries on its upper face a series of similar recording or read-out heads 73—80. Consequently, considering for example the discs 15, 16 (FIG. 9), the magnetizable surface 33 of disc 16 is scanned by the heads 65—72, while the magnetized surface 34 of disc 15 is scanned by the heads 73—80. The same scanning relation also takes place between the heads on the remaining carriages and the respective opposed magnetizable surfaces of the discs between which the respective carriages are located. The heads 65—72 and 73—80 may all be of identical construction, well known in the magnetic recording and read-out arts, and detailed description thereof is not considered necessary at this point.

Merely by way of example, let it be assumed that there are 256 separate record tracks on each face of a disc, these tracks being represented schematically by the concentric circular dot-dash lines 81 (FIG. 1); and let it be assumed that each carriage carries a set of eight recording or read-out heads. The eight heads on each carriage must be capable of being selectively moved into registry with any set of eight tracks of a corresponding allotted set of 32 tracks. In accordance with the invention, the selective movement is controlled by a binary number coded signal of five digits which by means of five cumulative motion devices, according to the invention, are capable of moving any desired carriage to the required distance radially with respect to the disc center, this movement being controlled in 32 equal increments.

Thus, as diagrammatically shown in FIG. 10 the carriages 39 and 51 which cooperate with the discs 15 and 16 are shown in their fully retracted position towards the right, where the head 72 is in alignment with track 1a of disc 16 and the head 80 is in alignment with track 1b of disc 15. The maximum linear movement of the heads is such as to bring head 72 into alignment with track 32a on disc 16 and, of course, the corresponding maximum movement of head 80 brings that head into alignment with track 32b on disc 15. In other words, each head is capable of being positioned in alignment with any one of a set of 32 tracks allotted thereto.

This selective setting of the heads is effected by a novel binary-code pulse control actuating mechanism, generally indicated in FIGS. 1 and 2 by the designation numeral 82. This mechanism is supported on the plate 10 so that its output shaft 83 is connected centrally at right angles to the rod 38, and the said mechanism includes a set of five actuator units 84—88. One of these units, namely unit 87, is shown in cross-sectional detail in FIG. 3, and also part of the two adjacent units 86 and 88 are shown in that figure. Since all the units are substantially the same, except for the different "throws" of the respective cams, the construction of unit 87 will be described in detail. Each unit comprises a housing 89 which has a set of three lugs 90, 91, 92 through which extends a set of three guide rails 93, 94, 95, which rails extend between the end walls of an enclosing housing 96, and which for purpose of clarity is omitted from FIGS. 3 and 4 but is shown in FIGS. 1 and 2, the housing 96 being supported on legs 97, 98.

One end wall 99 of housing 96 (see FIG. 1) carries a bearing through which extends a continuously driven shaft 100 driven by a suitable motor (100a) and which is connected to a drive pulley of the first unit 84. The unit 84 is anchored against sliding movement on the rails 93, 94, 95 but the remaining units 85—88 are independently slidable on those rails. The first unit 84 has connected to the drive shaft 100 a pulley 101 which drives through belt 102 and pulley 103 one element of any well known 180° rotary indexing clutch 104. Each of the remaining drive units has a similar drive shaft designation 124 (see FIG. 7) whereby continuous rotary power is transmitted to the respective pulley 101 in each of the units. Since all the units are alike in construction, the description will proceed with reference to unit 87 which is shown in full in FIGS. 3 and 4. The actuation of the clutch elements is controlled by an associated electromagnet 105 through a suitable clutch link 106. The clutch is such that when a momentary pulse is applied to the electromagnet 105, the shaft 107 is rotated by means of pulleys 108 and 108a and belt 109, through 180°, and then it stops, thus rotating its associated cam 110 likewise through 180°. Each cam 110 is supported for rotation in ball bearings 111, 112, and the flat opposite faces of the cam engage a pair of cam follower rollers 113, 114 which are fastened to a slidable rod 115. The rollers 113, 114 are anchored to a stationary bar 118 to provide a guide for the cam follower assembly. Fastened to the slidable rod 115 is an insulating sleeve 119 which carries an electrical spring contact 120 which is adapted to engage and disengage a corresponding spring contact 121 which is insulatingly mounted on the wall of housing 89.

Another electrical spring contact 122 is also insulatingly mounted on the wall of housing 89. It is clear, therefore, that by rotating the cam 110 through 180° the movable contact arm 120 will be moved into engagement, for example with contact 121, and will stay in such engagement until another impulse is applied to electromagnet 105 to cause the cam 110 to rotate through another 180° as a result of which the movable contact 120 will be moved into engagement with contact 122. The cam 110 plus the contacts 120, 121, and 122 constitute what is known in the art as a flip-flop circuit control. In other words, if it be assumed that the cam 110 has been previously rotated by a pulse applied to its magnet 105, to move the contact 120 into engagement with contact 121, that contact connection will remain continuously closed until the receipt of another pulse by electromagnet 105 to cause the contact 120 to flip into engagement with contact 122.

As pointed out above, the first unit 84 is anchored against sliding movement on the rails 93, 94, 95. However, its shiftable rod 115 corresponding to rod 115 already described in connection with unit 87, can be shifted back and forth under control of the cam 110 of unit 84 as above described. It should be noted, however, that each of the rods 115 extends through and is pinned to a hollow boss 123 so that as any rod 115 is shifted, it moves the succeeding housing 89 correspondingly. In order to transmit continuous rotary power to the drive pulleys 101 of each unit, the drive pulley shafts 124 (see FIG. 7) extend outwardly through the left hand wall of the housing 89 in slidable splined engagement with the corresponding splined end of the pulley drive shaft 124 of the next adjacent unit to the left. This permits the several units 85—88 to slide while maintaining the rotary drive power between the main drive shaft 100 and the driving pulleys 101 of the several units. Thus the driving element of the clutch plate in each of the units is maintained in rotation at all times, but the associated cam 110 of any unit is not rotated until the associated electromagnet 105 receives a signal pulse. The sets of contacts 121, 122 of the five units are connected to a source of binary code signals, which source is schematically demonstrated by the block 125 in FIG. 2.

The various units are shown in FIG. 3 with their shiftable rods 115 at their right hand position wherein the respective contact springs 120 are in contact with respective springs 121. In such setting the heads 72, 73, etc., are in registry with the first eight tracks of their respective group of 32 tracks. FIG. 6 shows another setting in which the cam 110, for example of unit 87, has been rotated 180° from its previous position as shown in FIG. 3. The 180° rotation of cam 110 of unit 87 thus moves its rod 115 to the left, thus moving the succeeding or fifth unit 88 also to the left. This movement of unit 88 does not, of course, change the previous setting of its contacts 119, 120 and likewise it does not change the previous setting of the corresponding contacts of the preceding three units 84, 85, 86.

It should be noted that the respective cams 110, for each of the five units, have different throws or strokes. For example cam 110 of the first unit 84 may have a throw "T" (FIG. 8) of 1/32 of an inch; cam 102 of the second unit 85 may have a throw of 1/16 of an inch; cam 102 of the third unit 86 may have a throw of 1/8 of an inch; cam 102 of the fourth unit 87 may have a throw of 1/4 of an inch; and cam 102 of the fifth unit 88 may have a throw of 1/2 inch. It will be seen, therefore, that the rod 38, and therefore all the recording and/or read-out heads, can be moved as a unit to any one of 32 different positions depending upon the permuted combinational simultaneous energization of the respective clutch electromagnets 104 in the various units. Thus, if only the clutch magnet of unit 84 receives a pulse, it causes its rod 115 to move to the left 1/32 of an inch. This motion is transmitted to all the succeeding units so that the rod 38 moves to the left 1/32 of an inch, thus moving the heads to the second track of each set. If the electromagnet of unit 85 alone receives a pulse, it causes the rod 38 to be moved 1/16 of an inch, and similarly for each of the succeeding units when they are solely pulsed. However, when the electromagnets of two or more units are simultaneously pulsed, the motion of the rods 115 is cumulative in moving the rod 38. For example, if the magnet of units 84 and 88 alone are simultaneously pulsed, the total movement of rod 38 will be 17/32 of an inch. If all the units are simultaneously pulsed, the total movement will be 31/32 of an inch. It is possible, therefore, by energizing the electromagnets of the five units in different permuted combinations to select any one of 32 positions for the heads with respect to their associated 32 track sections.

A description will now be given of the electrical controls (FIG. 12) for controlling the pulsed energizations of the five electromagnets which control the clutches in the units 84—88, these controls being designated by the block 125 (FIG. 2). Such a control must execute the following tasks for each positional unit: (a) Remember the state resulting from the last previous command pulse input potential. It should be noted that each of the rods 115 of the various units has two positional states, which may be represented by the binary digits zero and one; (b) Compare that state (a) with the state requested by the input potential at the instant of a new command pulse; (c) Utilize the comparison to actuate the solenoid of the associated clutch electromagnet if the two compared states are unlike, and to inhibit solenoid actuation if the two compared states are alike at the instant of the new command. Preferably the control circuit should also provide (d) Self-verifying action. For example, such a circuit can initiate a time delay signal for indicating either an error function, in the event the position reached at the time of the above-noted function (d) is not the position requested at the time of the new command. Finally it should execute an "address reached and verified" signal when such is the case, so that the work to be done at the requested position can proceed automatically without further delay.

Referring to FIG. 12, it will be assumed that the control circuit includes a set of five electromagnetic switch relays 126—130 each having a pair of stationary contacts and a movable armature contact. The relays 126—130 can be energized in any permuted combination which represents the address of the new command position for the member 38 which moves the various record or read-out heads above described. Associated with each relay is a corresponding set of memory switches of the respective units 84—88. For convenience of description the memory contacts of the various units are identified respectively as 120a, 121a, 122a; 120b, 121b, 122b; etc., and the respective clutch solenoids are likewise designated 105a, 105b, 105c, 105d, 105e. From the foregoing description it is apparent that the contact sets 120, 121, 122 of each unit provide a positive sensing or memory means to indicate whether the associated rod 115 is in its extended or in its retracted position with respect to its housing.

In FIG. 12 only the first, second and last carriages or sets of heads are shown with their respective disc records. Since the head carriages are arranged in axial array along the length of the main spindle 14, it is necessary to provide circuit means to select which particular group of eight heads is to be used at any given time. For that purpose each group of eight heads on a carriage is provided with a selection relay 39a, 51a, 52a, 58a, etc. Each of these relays may be selectively operated under control of any suitable selection circuit. For example they may be connected to the output pairs of any well known binary coding and decoding device 131, whose input wires are energized with the appropriate potentials to identify the particular relay 39a, 51a, etc., to be energized. Merely for explanation, it will be assumed that the heads on carriage 51 are to be selected, in which case the conductor pair 132, 133 will be energized to operate relay 51a. This relay connects the conductors from the eight record-read out heads on carriage 51 through the corresponding multi-contacts of relay 51a to the corresponding output information terminals leading to the utilization circuit 134. It will be understood that while each of the relays 51a, etc., is shown with a single armature and contact, actually there will be contacts for each of the heads in the carriage to which the said relay is connected, and one or as many armatures as needed to handle these contacts.

Having selected the proper set of heads and therefore the proper record disc, in this case disc 15, it is necessary to move the selected set of heads to the particular group of thirty-two radial settings above described. This is controlled by the circuit arrangement shown to the right of FIG. 12. There is shown a control for five binary elements A—E representing respectively the units 84—87 of the preceding figures. As described hereinabove, the memory switch 120, 121, 122 of each of the binary units constitutes what is known as "flip-flop" switch such as is commonly known and used in binary counting systems. The circuit is shown in FIG. 12 having a setting for a "present position" represented by the binary number 1 0 0 1 0 (reading from right to left). In other words, the present setting of FIG. 12 represents the rods 115 of units 84 and 87 as extended to the left, and the rods 115 of units 85, 86 and 88 as retracted. In FIG. 12 the numeral "0" adjacent each contact indicates the position of a rod retracted to the right, and the numeral "1" represents the position of a rod extended to the left. Let it now be assumed that at one instant the command for the new setting is represented by the positions of the armatures of relays 126—130, as shown, their setting being represented by the binary number 0 0 1 1 1. In other words, rods 115 of units 84, 86 and 88 must be moved to their alternate settings while the rods 115 of units 85 and 87 must stay put. The circuit through the main command relay 135 is closed for a short interval which is long enough to insure that the clutches 104 of the appropriate units are engaged by the tripping of their respective clutch solenoids 105 for the normal 180° rotation of the associated cam, but not long enough to continue the clutch action beyond the 180° cam rotation. For example, for a clutch solenoid operable in ten milliseconds and a clutch shaft speed of 600 r.p.m. (a 180° rotation in fifty milliseconds), these time limits can be safely maintained by energizing the winding of relay 135 through a simple capacitor discharge. Accordingly, the trip clutch solenoids of units 84, 86, 88 only will be energized. As a result the various units of the device 82 will cooperate to move the heads on the selected carriage 51 into registry with the appropriate set of eight tracks on disc 15 determined by the setting of the relays 126—130.

The circuit of FIG. 12 includes a self-verifying arrangement which automatically checks the operation of the selection controls and which, in the case of an error in operation on the first cycling, recycles the mechanism. If no error condition occurs during the first cycling, or during the second cycling, a suitable "proceed" signal is transmitted to the utilization circuit 134.

If the setting of the elements 115 does not require any change as a result of a new command transmitted to the relays 126—130, then all the circuits through the clutch magnets 105a—105e remain open. However, the closure of the contacts of the command relay 135 for a sufficiently short interval closes a circuit in series through the primary winding of transformer 136 and a high resistance 137, that resistance being very high in comparison with the resistances of the parallel connected clutch magnets. This results in a sharp pulse 138 which triggers a suitable delay multivibrator 139 which produces at its output a timing pulse 140. The circuits are so designed that the timing pulse 140 begins at the same instant as the beginning of the cam dwell, as indicated by the correlated graphs in FIG. 12A. The leading and trailing edges of pulse 140 are differentiated. The differentiated pulses are applied to respective inputs of a pair of "and" gates 141, 142. Since the resistance 137 is high compared with the shunt impedance of the various windings 105a—105e, the voltage "V" on conductor 143 swings negative only if all the circuits through windings 105a—105e are open after the contacts of relay 135 release. The voltage "V" is applied uninverted to the other input of gate 142 but is inverted by a suitable D.C. inverter 144 before application to the other input of gate 141. The gate 141 when gated on, produces the proceed signal voltage $a$ (see FIG. 12A) at its output. The gate 142 when gated on produces an error voltage $e$ at its output, which controls a 2-count flip-flop device 145 of any well known kind. Associated with the flip-flop counter 145 are two additional "and" gates 146, 147. Gate 146 is gated on during the first cycling operation and provided the new command has not been properly executed. That is, if a circuit remains closed through any of the windings 105a—105e after the command relay 135 has been released. The gate 147 is gated on only during the second cycling and provided the command still remains improperly executed. In that event a suitable alarm 148 is operated. An attendant, after finding the cause of error, can reset the flip-flop controls to normal by momentarily operating reset switch 149. When gate 146 is "on" during the first cycling and if the command has not been properly executed, it operates the power amplifier 150 which supplies a local reoperating circuit for reoperating the relay 135 and starting the second cycling operation.

The manner in which the self-checking circuit operates will be more clearly understood from the correlated graphs of FIG. 12A. When the initial pulse 138 is generated by the closure of the contacts of relay 135 to initiate a new command, it triggers the multivibrator to produce timing pulse 140, which in turn produces the differentiated pulses 151, 152. Upon the opening of contacts of relay 135 the voltage "V" on conductor 143 will either remain at its normal static setting or it will go negative. If the command has not been properly executed at this time, the positive voltage "V" will be coincident with the positive pulse 152 and gate 142 will be gated on to cause the flip-flop 145 to count one and also to cause the gate 146 to be gated on, thus starting recycling.

It will be clear that during the first cycling, assuming the command has been correctly executed, the negative voltage "V" on conductor 143, resulting from the release of relay 135, is inverted in inverter 144 and is applied to the gate 141, which therefore passes the proceed signal to conductor 153. At the same time the negative voltage is applied directly to gate 142 to prevent the gating on of that gate. If, however, during the first cycling operation the command had been improperly executed the positive voltage on conductor 143 would gate the gate 142 on and would prevent the gate 141 being gated on. As a result of this the error signal "e" from gate 142 operates the counter 145 and also gates gate 146 on to cause relay 135 to be reoperated. If during this recycling operation the command is not properly executed the gate 147 only is gated on to cause the alarm 148 to be operated.

It will be understood, of course, that the invention is not limited to only two cycling operations. For example, if the counter 145 is designed to count "n" pulses, the equipment will undergo n recyclings until the proper command is executed or an alarm given.

The invention is not limited to any particular kind of utilization circuit. However, as an illustration of one particular utilization, the invention may be applied to a reservation control system of the kind described in U.S. Patent No. 2,587,532 to E. L. Schmidt, wherein the binary number information from the output of the selected eight heads, for example head 39, is used to control any suitable indicating or computing mechanism. Since such mechanisms usually require a synchronizing or clock pulse, there may be provided a single stationary read-out head 154 which can be mounted adjacent one of the discs, that disc having a separate clock pulse or synchronizing recorded track which generates the desired synchronizing or clock pulses in timed synchronism with the rotation of the spindle 14. Preferably, although not necessarily, the clock pulse generating head 154 is mounted adjacent the center disc so as to reduce the likelihood of vibration or wobble in the clock pulse. As indicated schematically in FIG. 12, the clock pulse recordings may be on the edge of the discs, although any other convenient track location on the disc surface may be used for that purpose. It will be understood, of course, that while the invention has been described in connection with eight read-out heads on each unit, a greater or less number may be employed depending upon the number of digits in the binary code to be used in controlling the utilization circuit 134. In fact, the invention may be used with only a single head on each carriage since each such head can be moved to any one of thirty-two separate tracks as above described.

The invention is not limited to the particular manner of cam operation of the head positioner unit 82, as described in the foregoing figures. Thus, there is shown in FIG. 13 in schematic form a modification of that unit. The parts of FIG. 13 which are identical with those of the preceding figures bear the same designation numerals. In this embodiment the five housings 84, 85, 86, 87, 88, of which only three are shown in FIGS. 13 and 14, are slidable on the rails 93, 94, 95. Each housing includes a cam operated unit comprising a cam 155 which is located within a reciprocating cam follower frame 156 which forms part of the housing and is, therefore, slidable therewith as above described. Each cam is driven through a respective shaft 157 and associated indexing clutch 104, controlled by its respective clutch magnet 105. The various housings are driven from a common drive shaft through respective splined shift sections 124. Each cam carries an eccentrically located pin 158 linked to one of the operating rods 115. Each rod 115 is mechanically linked to the frame 156 of the next succeeding unit. Each rod 115 carries the contact sets 120, 121, 122 for purposes above described. It is clear, therefore, that by operating the appropriate clutch magnets 105, the corresponding cams 155 will be driven through 180° rotation so as to position the rods 115 either in their extreme left-hand position or extreme right-hand position, as seen in FIGS. 13 and 14, correspondingly controlling their respective contact sets 120, 121, 122. Therefore, the action of the output movement of the various units 84—88 will be mechanically cumulative, and with five such units thirty-two different mechanical settings of the output shaft 83 are obtainable, for example by having the pins 149 of the various units located at respectively different distances from the center of the associated cam.

It also will be understood that the invention is not limited to the use of record carriers of disc shape. Thus, there is shown schematically in FIG. 15 a positioner control 82 similar to the corresponding unit 82 of FIGS. 1 to 12 or to the corresponding unit of FIGS. 13 and 14. This positioner control may operate a carriage 159 carrying the series of recording or read-out heads 160 on one side and another series of recording and read-out heads 161 on the opposite side. The carriage 159 with the two sets of heads may be located between a pair of constantly rotating magnetic drums 162, 163, each of which has a series of parallel concentric record tracks represented by the dotted lines.

It will also be understood that while the flip-flop switches 120, 121, 122 are shown of the mechanical switching kind, other equivalent switching mechanisms may be used. For example, FIG. 16 shows a photoelectric type or photo-voltaic type of switch; FIG. 17 shows a phase shift type of switch; FIG. 18 shows a variable impedance type of switch; and FIG. 19 shows a variable capacitance type of switch. In FIGS. 16–19 the parts which are the same as those of the preceding figures bear the same designation numerals. For example, in FIG. 16 one of the five shiftable housings is indicated by the numeral 89, and the corresponding shiftable rod in that housing is indicated by the numeral 115. The rod 115 may be provided with a pair of spaced shutter openings 164, 165 so that as the said rod is moved to its forward or retracted position as hereinabove described, it uncovers one of a pair of photoelectric cells 166, 167. For example, when the rod 115 is in its retracted position it uncovers the cell 167, but in its forward position it uncovers the cell 166. Attached to the housing 189 is a member 168 provided with a pair of shutter openings 169, 170, which are illuminated by a suitable light source or electric lamp 171. It is clear, therefore, that the voltage at the point "P" will be either positive or negative depending upon which one of the photocells is uncovered and exposed to the light from source 171. This two-polarity signal at point "P" can be applied to any suitable device such as a polarized relay for operating the flip-flop contact 120 to either of its two positions as described above in connection with FIG. 12 and likewise controlling the circuit through the associated clutch magnet 105.

In the switch of FIG. 17, the retractable rod 115 carries a coupling winding 172 which is moved from the full line position to the dotted line position with respect to a primary winding 173, which latter is supplied with an alternating current from a suitable source 174. The two positions of the winding 172 corresponding respectively to the forward and retracted position of the rod 115 changes the phase of the current or voltage applied to a suitable phase detector 175, which in turn can control a polarized relay for operating the flip-flop contact 120.

In FIG. 18, the operation of the flip-flop contact 120 is controlled by a solenoid 176 carried by the rod 115. When the rod is in its retracted position the solenoid 115 is in registry with the gap 177 of a soft iron magnetic core 178. When the rod 115 is moved to its forward position the solenoid 176 is in registry with the gap 179 of a permanent magnet 180, thus changing the impedance across the solenoid 115. This change in impedance can be used to control any suitable flip-flop device for operating the flip-flop contact 120.

In the embodiment of FIG. 19, the control of the flip-flop contact 120 is effected by a condenser plate 181 which is normally close to a fixed condenser plate 182 when the rod 115 is in its retracted position. When the rod 115 is in its forward position the plate 181 is closer to another condenser plate 183. The plates 182, 183 are connected across a balanced bridge network comprising the alternating current source 184 and the fixed condensers 185, 186. Here again the movement of the condenser plate 181 changes the phase of the current from the balance bridge, which change of phase can be used to control the operation of the flip-flop contact 120.

Various changes and modifications may be made in the disclosed embodiments without departing from the spirit and scope of the invention.

What is claimed is:

1. Apparatus for selective recording or read-out of signals on a moving carrier having a multiplicity of signal tracks, comprising at least one record-read-out head, and means to move said head into a position of operative registry with any desired one of said tracks, the last mentioned means comprising a series of aligned positional units each including an actuator member and a slidable support therefor, each actuator member arranged to assume an extended or retracted position with relation to its own support and being connected to the next support in the series, a rotary cam for each actuator, and a selectively operable clutch for each cam to cause the associated actuator member to assume a retracted position for one portion of the cam rotation and an extended position for another portion of the cam rotation.

2. A flip-flop positioning control device comprising a slidably mounted support, a shiftable flip-flop member carried by said support, a cam follower attached to said member, a rotary cam for said follower for moving said member during half the cam revolution to one flip-flop position and during the next half cam revolution to move said member to another flip-flop position, an electric contact member movable as a unit with said flip-flop member, a continuously rotating shaft, a momentarily actuating clutch between said shaft and cam, an electromagnetically controlled trip member which when momentarily energized causes said clutch to rotate said cam from one rest position and then through 180° to another rest position, thereby moving said member to its two different flip-flop positions, and circuit connections including said contact for controlling the momentary energization of said electromagnetic trip member.

3. A positioning control device of the kind described comprising, a main driving shaft, a plurality of positioner units each including a slidable support, a rotary cam, a clutch, a shiftable flip-flop member and an electromagnetically controlled trip for said clutch, each unit also including a pair of spaced contacts and a transfer contact the transfer contact being movable with the associated flip-flop member, circuit connections from each transfer contact to the clutch electromagnet; and means connecting the flip-flop member of a preceding one of said units to the slidable support of the next succeeding unit for the purpose described.

4. Apparatus for selective record or read-out of signals, comprising a main driving spindle, a series of record discs attached to said spindle in axially spaced relation, a series of recording or read-out heads one for each disc and each arranged to be moved radially of its associated disc to bring it into transducing relation with any desired radial point on the disc, and means to selectively move said head to said desired radial point, the last mentioned means including a mechanical motion link connected to said head, said link including a series of units each comprising independently slidable supports and each support carrying an independently shiftable flip-flop member, and means to change the effective length of said link, the last mentioned means including a rotary cam, a cam follower and an intermittently acting clutch for each of said units, and means to operate said cams in permuted combinations.

5. Apparatus for selective recording or read-out of signals, comprising a main driving spindle, a series of record discs attached to said spindle in axially spaced relation, a series of recording or read-out heads one for each disc, said heads being arranged in pairs and attached to a common carriage for movement radially of the discs, one of said heads being in transducing relation with the underface of one disc and the other head being in transducing relation with the upper face of the next adjacent disc, means to select a particular read-out head for transducing action with respect to the associated disc and permutation control means to shift said selected head radially into operative transducing relation with a particular radial point on its associated disc.

6. Apparatus for selective recording or read-out of signals comprising a series of axially spaced discs each carrying a series of separate concentric magnetic signal tracks, at least one recording or read-out head for each disc, means to select a particular head for transducing action with respect to its associated disc, and means to move said selected head radially of the disc to select a particular track on that disc, the last mentioned means including a series of positional units each having a mechanically shiftable flip-flop member and an independently movable support, the conjoint motion of said flip-flop members and supports determining the extent of said radial movement of said selected head, a series of flip-flop electrical contacts one such set for each of said flip-flop members, a plurality of electromagnetic drives one for each unit to selectively shift the mechanical flip-flop member and its associated contact, each of said drives including a respective rotary cam and control clutch with an electromagnetic clutch tripping member, and circuit means including said contacts to set said cams and flip-flop members in permuted combinations.

7. Apparatus for selective recording or read-out of signals on a moving carrier having a multiplicity of signal tracks, comprising at least one record-read-out head, and means to move said head into a position of operative registry with any desired one of said tracks, the last mentioned means including a plurality of positioner units each including a movable element having two selective settings, permutation control means to set said elements in permuted combinations and thereby to move said head to said position of operative registry, said permutation control means including a plurality of sets of flip-flop contacts one for each unit and a corresponding plurality of sets of command control contacts one for each unit, and self-verifying circuit means interconnecting the flip-flop contacts and the command contacts to determine that the positioned units have assumed a correct setting in response to a newly received command signal.

8. Apparatus for selective recording or read-out of signals on a carrier having multiple signal tracks thereon, comprising a transducing head mounted adjacent said carrier to cooperate with the signal tracks thereon; positioning means operable to shift said transducing head in a transverse direction with respect to the signal tracks on said carrier, said positioning means including a plurality of serially-connected motion-producing devices arranged when actuated to produce in said transverse direction a cumulative total output motion corresponding to the sum of the individual output motions of said devices, each of said devices including means arranged when actuated to produce an output motion of a particular fixed magnitude; continuously rotatable means for supplying operating power to said devices; individual clutch means for each of said devices for transmitting power from said continuously rotatable means to the corresponding device; and control means for selectively activating said clutch means in various combinations.

9. Apparatus for selective recording or read-out signals on a carrier having multiple signal tracks thereon, comprising a transducing head mounted adjacent said carrier to cooperate with the signal tracks thereon; positioning means operable to shift said transducing head in a transverse direction with respect to the signal tracks on said carrier, said positioning means including a plurality of serially-connected motion-producing devices arranged when actuated to produce in said transverse direction a cumulative total output motion corresponding to the sum of the individual output motions of said devices, each of said devices including means arranged when actuated to produce an output motion of a particular fixed magnitude; continuously rotatable means for supplying operating power to said devices, said rotatable means including a series of shafts each located adjacent a corresponding one of said devices, slidable connection means coupling said shafts for rotation together while permitting relative axial movement therebetween in accordance with the actuation of said devices; individual clutch means for each of said devices for transmitting power from the adjacent one of said shafts to the corresponding device; and control means for selectively activating said clutch means in various combinations.

10. Apparatus for selective recording or read-out of signals on a carrier having multiple signal tracks thereon, comprising a transducing head mounted adjacent said carrier to cooperate with the signal tracks thereon; positioning means operable to shift said transducing head in a transverse direction with respect to the signal tracks on said carrier, said positioning means including a plurality of serially-connected motion-producing devices arranged when actuated to produce in said transverse direction a cumulative total output motion corresponding to the sum of the individual output motions of said devices; continuously rotatable means for supplying operating power to said devices; an individual 180° rotary indexing clutch means for each of said devices for transmitting power from said continuously rotatable means to the corresponding device, each of said devices including cam means arranged when actuated by the output of the corresponding clutch means to produce a motion of a particular fixed magnitude; and control means for selectively activating said clutch means in various combinations.

11. Apparatus for selective recording or read-out of signals on a carrier having multiple signal tracks thereon, comprising a transducing head mounted adjacent said carrier to cooperate with the signal tracks thereon, positioning means operable to shift said transducing head in a transverse direction with respect to the signal tracks on said carrier, said positioning means including a plurality of motion-producing devices serially interconnected to produce in said transverse direction a cumulative total output motion corresponding to the sum of the individual output motions of said devices, each of said devices including means arranged when actuated to produce an output motion of a particular fixed magnitude; input circuit means for producing individual actuating signals for said motion-producing devices to permit them to be operated in various combinations; separate two-condition switch means for each of said devices and operable into one or the other condition in accordance with whether or not the corresponding device is in actuated position; and comparison means interconnecting said input circuit means with said switch means and including means to produce actuation of any one of said devices when its position does not correspond to its actuating signal as applied by said input circuit means.

12. Apparatus for selective recording or read-out of signals on a carrier having multiple signal tracks thereon, comprising a transducing head mounted adjacent said carrier to cooperate with the signal tracks thereon, positioning means operable to shift said transducing head in a transverse direction with respect to the signal tracks on said carrier, said positioning means including a plurality of motion-producing devices serially interconnected to produce in said transverse direction a cumulative total output motion corresponding to the sum of the individual output motions of said devices, each of said devices including means arranged when actuated to produce an output motion of a particular fixed magnitude; input circuit means for producing individual actuating signals for said motion-producing devices to permit them to be operated in various combinations, start signal means adapted to be momentarily operated to apply the actuating signals of said input circuit means to said devices; separate two-condition switch means for each of said devices and operable into one or the other condition in accordance with whether or not the corresponding device is in actuated position, verifying circuit means connected to said input circuit means and said switch means, said verifying circuit means including means to produce an error signal if the position of said devices does not correspond to the respective actuating signals, and recycle means operable by said error signal to reactivate said start signal means.

13. Apparatus as claimed in claim 12, including counter means operable by said error signal, and alarm means operable by said counter means after said apparatus has been recycled a predetermined number of times without achieving correspondence between said actuating signals and the positioning of said devices.

14. Apparatus for selective recording or read-out of signals on a carrier having multiple signal tracks thereon, comprising a transducing head mounted adjacent said carrier to cooperate with the signal tracks thereon, positioning means operable to shift said transducing head in a transverse direction with respect to the signal tracks on said carrier, said positioning means including a plurality of serial-connected motion-producing devices each comprising a rod, all of said rods being in parallel alignment, a cam follower attached to each rod, a rotary cam for each follower, each cam during one half revolution causing the associated rod to assume an extended position and during the next half revolution to assume a retracted position, a main rotary shaft for driving said cams, individual electromagnetic clutch means between said shaft and each cam, and control means for actuating said clutch means in selected combinations to determine the cumulative action of all the rods.

References Cited in the file of this patent

UNITED STATES PATENTS

| | | |
|---|---|---|
| 2,674,728 | Potter | Apr. 6, 1954 |
| 2,852,762 | MacDonald | Sept. 16, 1958 |
| 2,910,669 | Brand | Oct. 27, 1959 |
| 2,916,205 | Litz | Dec. 8, 1959 |

OTHER REFERENCES

"500,000,000 Bit Random-Access Memory" by George E. Comstock, Instruments and Automation, Nov. 1956, pp. 2208–2211 (FIG. 3 relied on).